UNITED STATES PATENT OFFICE.

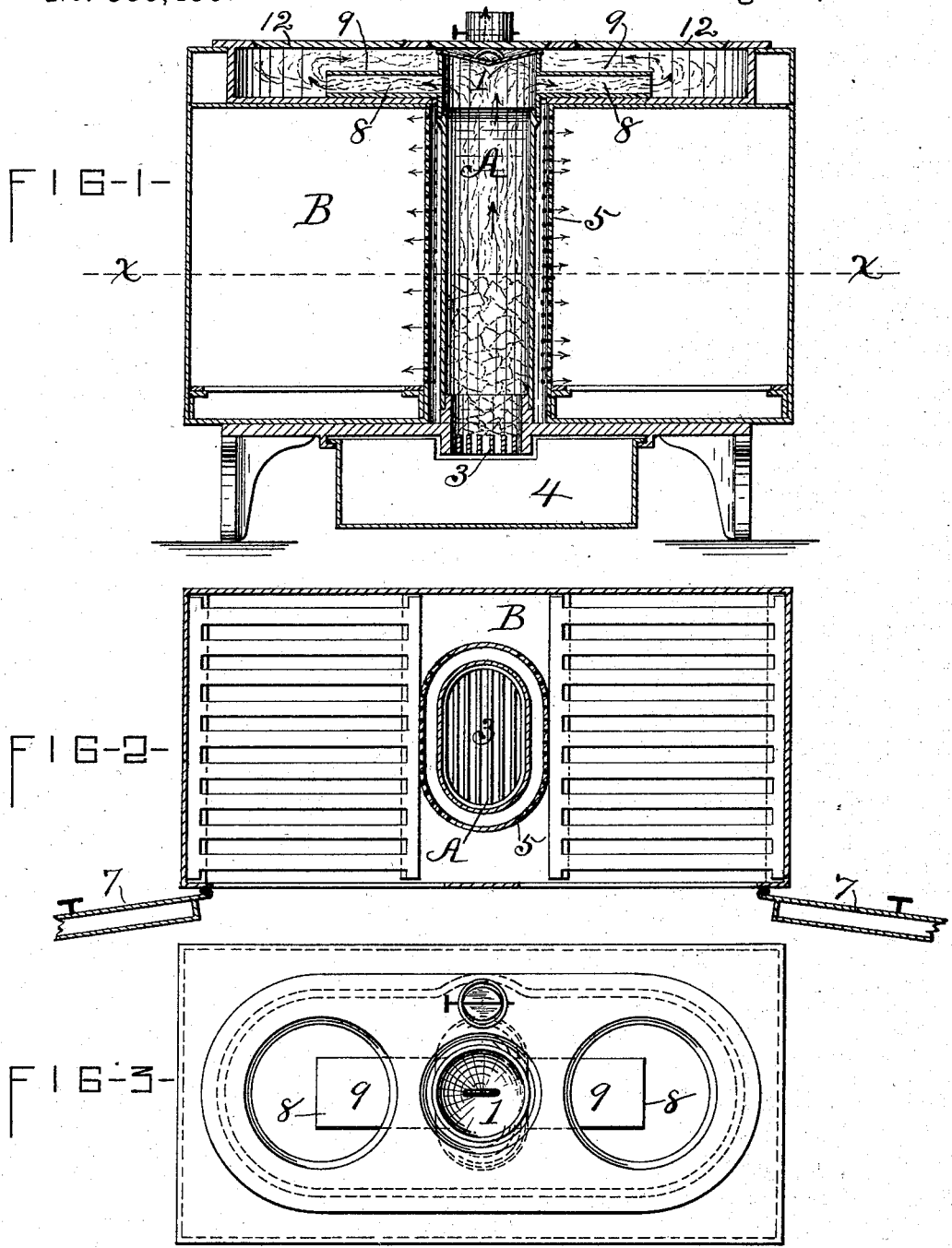

CHARLES MORSE, OF SYRACUSE, NEW YORK.

CHARCOAL-BURNING COOKING-STOVE.

SPECIFICATION forming part of Letters Patent No. 388,435, dated August 28, 1888.

Application filed August 4, 1887. Serial No. 246,099. (No model.)

*To all whom it may concern:*

Be it known that I, CHARLES MORSE, of Syracuse, county of Onondaga, in the State of New York, a citizen of the United States, have invented certain new and useful Improvements in Charcoal-Burning Cooking-Stoves, of which the following is a specification, reference being had to the accompanying drawings, in which—

Figure 1 is a vertical section; Fig. 2, a horizontal section taken on line *x x*, Fig. 1; and Fig. 3, a top plan view.

Similar letters and figures of reference indicate corresponding parts throughout the several views.

This invention relates to that class of stoves which are constructed with a central fire-pot and combustion-chamber, a perforated wall around it, and an oven, the fire-pot being substantially in the center of the oven, and an ordinary top plate provided with lids.

It consists in the several novel features of construction and operation hereinafter described, and which are specifically set forth in the claim hereunto annexed; and my object is to produce a portable stove of great utility, simplicity, and cheapness, as well as great heating, baking, and cooking capacity, with economy of fuel.

It is constructed as follows:

A is the fire-pot and combustion-chamber, consisting of an oval shell of sheet or cast metal, shown in the drawings as oval for most of its length, and thence tapering to a round at its top, where it is closed by a circular cover, 1, and having a grate, 3, at the bottom; and 4 is the ash-pan.

B is the oven, partially divided by the fire-pot, which is substantially in the center of the oven.

Surrounding the fire-pot, and somewhat separated therefrom, I place a vertical oval wall, 5, which is perforated, so that the hot air radiated from the fire-pot can pass through into the oven.

In the bottom of each oven I place a slat-work, and 7 7 are the oven-doors.

From the top of the fire-pot the products of combustion, striking against the convexity of the cover 1, are deflected and carried horizontally over the top of the oven both ways through the flues 8 8, of which the plates 9 9 are the tops, and then returning over the top of the plates and between them and the top of the stove enter the stove pipe and pass off through it and the chimney. In this manner I obtain, also, downward radiation into the oven, as well as heat the top of the stove, which is provided with openings closed by circular lids 12 12.

My object in constructing the fire-pot and its surrounding perforated wall of substantially oval shape in cross-section is to enable me to obtain a greater breadth or degree of heating-surface or radiation at either side, where the greatest amount of heat is essential, and at the same time occupying no more longitudinal space in the oven than it would were it of cylindrical or tubular form in cross-section, and yet at the same time being capable (on account of its oval form) of giving a much greater amount of direct side radiation than any other form of construction.

What I claim as my invention, and desire to secure by Letters Patent, is—

The combination, in a stove, of an oven provided with an oval fire-pot passing vertically through the center thereof and formed tapering at its upper portion and provided at its lower portion with a suitable grate and an ash-pan below said grate, an oval perforated wall surrounding the fire-pot and extending upward the height of the oven and sufficiently separated from the fire pot to form a radiating-chamber, a convex deflector-cover situated at the top of the fire-pot, horizontally-mounted deflecting flues arranged at opposite sides of the fire-pot and connecting therewith a short distance below the convex deflector, and an exit-flue at the rear of said deflector-cover, all constructed and operating substantially as described.

In witness whereof I have hereunto set my hand this 14th day of July, 1887.

CHARLES MORSE.

In presence of—
WM. C. RAYMOND,
WM. BOON.